United States Patent [19]

Palumbo et al.

[11] Patent Number: 5,628,247
[45] Date of Patent: May 13, 1997

[54] AUTOMATIC CITRUS FRUIT JUICER

[75] Inventors: Cesare Palumbo; Salvatore Torrisi, both of Catania, Italy

[73] Assignee: A.I.D. Agriculture Industrial Developments S.p.A., Catania, Italy

[21] Appl. No.: 601,660

[22] Filed: Feb. 14, 1996

[30] Foreign Application Priority Data

Feb. 24, 1995 [IT] Italy .................... BO95A0066

[51] Int. Cl.$^6$ .................... A23N 1/00; B30B 3/04; B30B 9/20; B30B 9/32

[52] U.S. Cl. .................... 99/509; 99/495; 99/510; 99/513; 100/121; 100/157; 100/210; 100/902

[58] Field of Search .................... 99/495, 501–507, 99/510–513; 100/49, 157, 902, 174, 121, 210

[56] References Cited

U.S. PATENT DOCUMENTS

| | | |
|---|---|---|
| 2,099,739 | 11/1937 | Jenkins . |
| 2,334,783 | 11/1943 | McKinnis . |
| 2,682,832 | 7/1954 | Lohre et al. . |
| 4,088,070 | 5/1978 | Montagroni et al. . |
| 4,774,880 | 10/1988 | Nelson . |
| 5,182,984 | 2/1993 | Wagner .................... 99/509 |

Primary Examiner—Timothy F. Simone
Attorney, Agent, or Firm—Guido Modiano; Albert Josif

[57] ABSTRACT

The automatic citrus fruit juicer has a fixed frame with an upper platform and a lower platform. A first drum with a vertical axis is rotatably mounted and actuated between the platforms and is crossed by holes for the passage of fruit juice. A second drum with a vertical axis is rotatable eccentrically outside the first drum and is provided with lateral pressing means for pressing its inner surface toward the outer surface of the first drum at a citrus fruit squashing region. A unit for cutting fruits into two halves is mounted above the drums at an opening of the upper platform provided to allow the fruit halves to drop between the drums so that the cut surfaces of the citrus fruits rest against the surface of the first drum. The lower platform is provided with a hole for the exit of the fruit juice and with a chute for removing the peels of the squashed fruit halves.

9 Claims, 8 Drawing Sheets

AUTOMATIC CITRUS FRUIT JUICER

BACKGROUND OF THE INVENTION

The present invention relates to an automatic citrus fruit juicer.

Automatic citrus fruit juicers are known that are used to prepare doses of fruit juice to be consumed immediately; such machines are installed autonomously, as equipment for bars or the like, or installed in more complex coin-operated machines for dispensing fruit juices or squashes, which comprise a refrigerated citrus fruit store, a token-operated system, a station for dispensing paper or plastic cups, and other devices.

Conventional juicers have some drawbacks in relation to their complexity, to the large number of components that must be washed frequently, and to periodic maintenance, which entails the rather complicated disassembly of several parts.

SUMMARY OF THE INVENTION

An aim of the present invention is to obviate the above mentioned drawbacks of conventional devices, i.e., to provide an automatic citrus juicer that is extremely simple and can be easily and rapidly disassembled for the periodic cleaning and maintenance required for a reduced number of components that can be accessed easily.

Within the scope of this aim, an object of the present invention is to achieve the above aim with a structure that is simple, relatively easy to manufacture, safe in use, effective in operation, and relatively low in cost.

This aim and this object are both achieved by the present automatic citrus juicer, characterized in that it comprises: a fixed frame that has an upper platform and a lower platform; a first drum with a vertical axis rotatably mounted and actuated between said platforms and crossed by a plurality of holes for the passage of the fruit juice; a second drum with a vertical axis, which is supported so that it can rotate eccentrically outside the first drum and is provided with lateral pressing means adapted to press its inner surface toward the outer surface of the first drum at a squashing region; a unit for cutting the fruits into two halves, which is mounted above said drums at an opening of the upper platform to allow the cut fruit halves to drop between the drums so that the cut surfaces rest against the surface of the first drum; the lower platform being provided with a hole for the exit of the juice and with an opening for removing the peels of the squashed fruit halves.

BRIEF DESCRIPTION OF THE DRAWINGS

Further particularities will become apparent and evident from the detailed description of a preferred but not exclusive embodiment of an automatic citrus juicer according to the invention, illustrated only by way of non-limitative example in the accompanying drawings, wherein.

DESCRIPTION OF THE PREFERRED EMBODIMENTS

With reference to the above figures, the reference numeral 1 generally designates an automatic citrus fruit juicer according to the invention.

The juicer 1 comprises a fixed frame that is constituted by an upper platform 2 and a lower platform 3 that are parallel to each other and have a substantially square shape; said platforms are joined, at their corners, by posts 4 that continue downwards with portions 4a that act as supporting feet.

A first drum 5 is mounted between the platforms 2 and 3, and its lateral surface is crossed by a plurality of holes for the passage of fruit juice; in a downward region, said drum is provided with a hub 6 that is rotatably supported by the platform 3; a gear 7 is keyed on the hub 6 and is engaged by a pinion 8 which is rotatably actuated by a gearmotor unit 9 fixed below the platform 3.

The reference numeral 10 designates a second drum having a vertical axis, which is supported so that it can rotate eccentrically outside the first drum and is provided with means for lateral pressing in the direction of the arrows A, which are adapted to press its inner surface toward the outer surface of the first drum at a squashing region; the lateral presser means comprise arms which are mounted so that they can oscillate with a differentiated elastic preloading respectively above, 11a, and below, 11b, the platforms 3 and 2; said arms support, at their ends, respective freely rotating rollers 12 for pressing and guiding two outer rings 13a and 13b that are fixed to the ends of the second drum.

Figure 1:
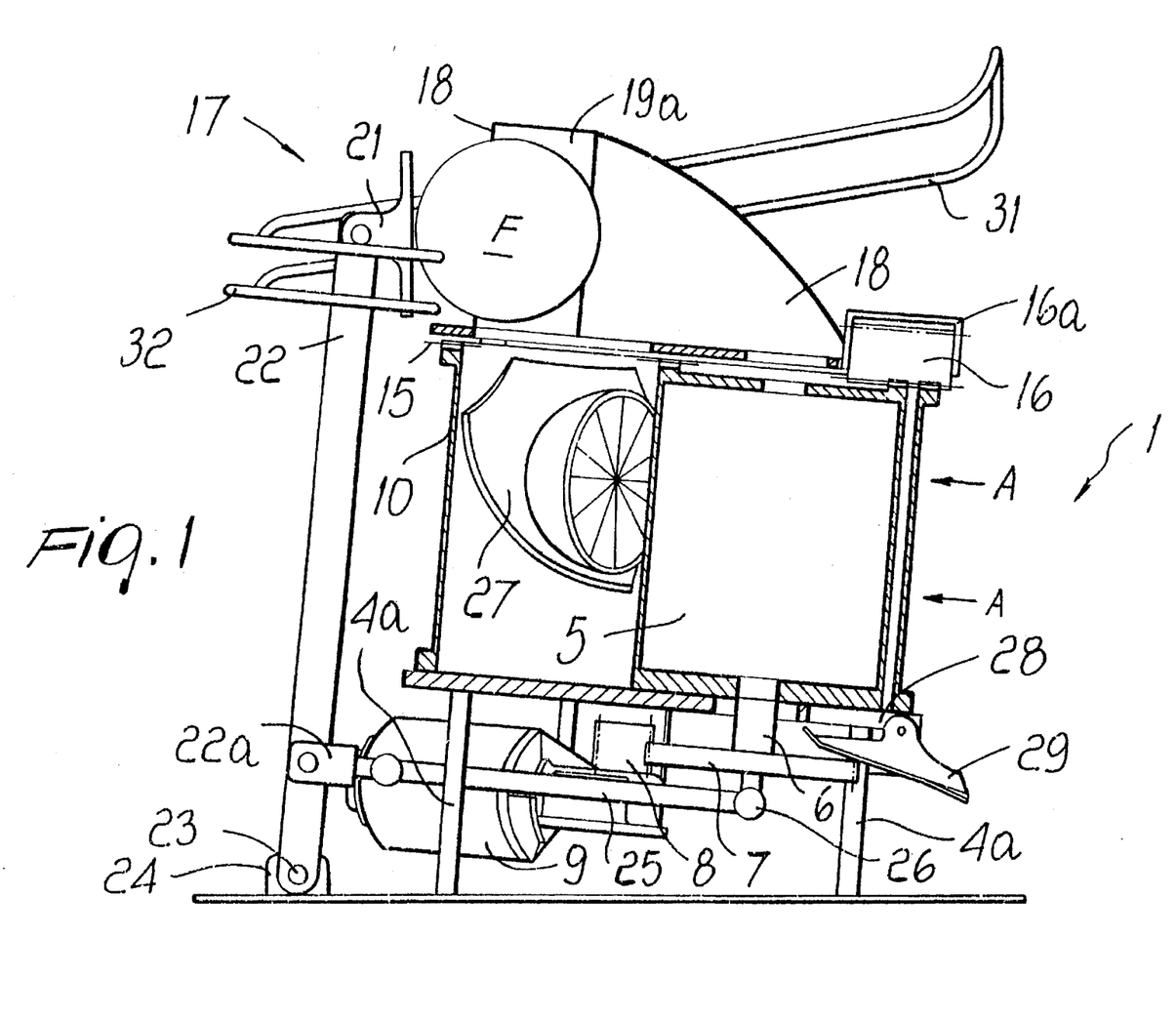
FIG. 1 is a partially sectional side view of an automatic citrus juicer according to the invention.
Figure 2:
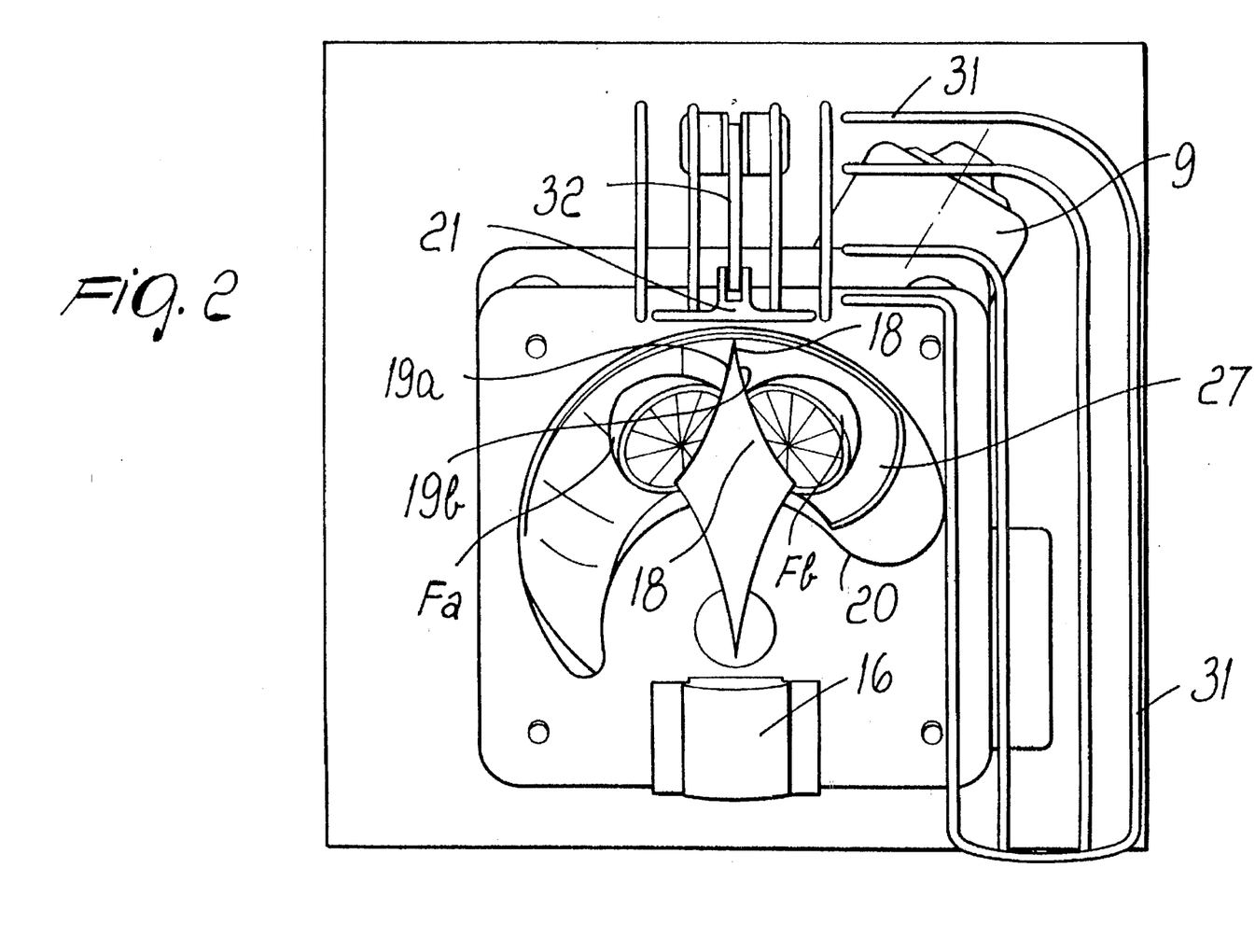
FIG. 2 is a plan view of the juicer.
Figure 3:
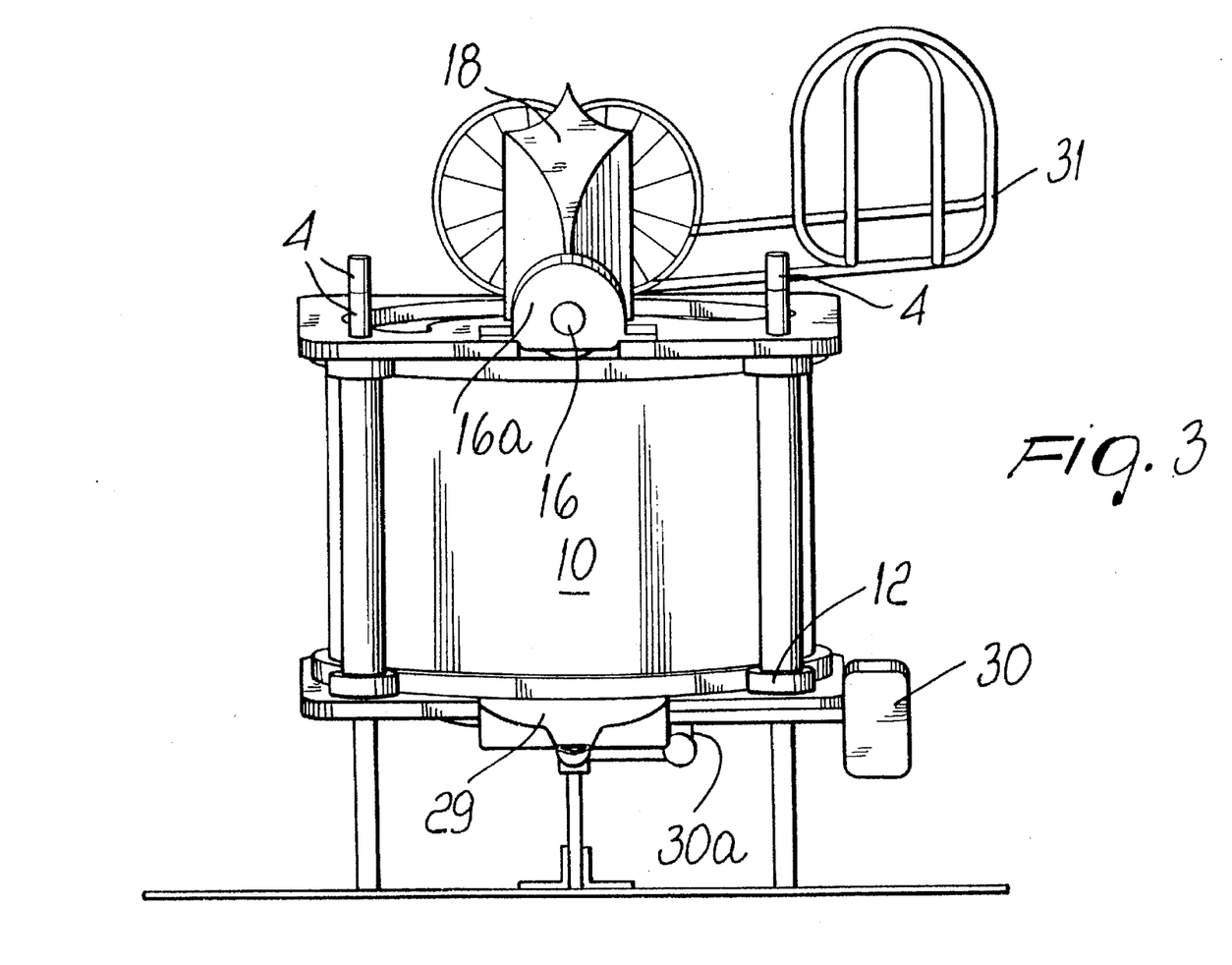
FIG. 3 is a front view of the juicer.
Figure 4:
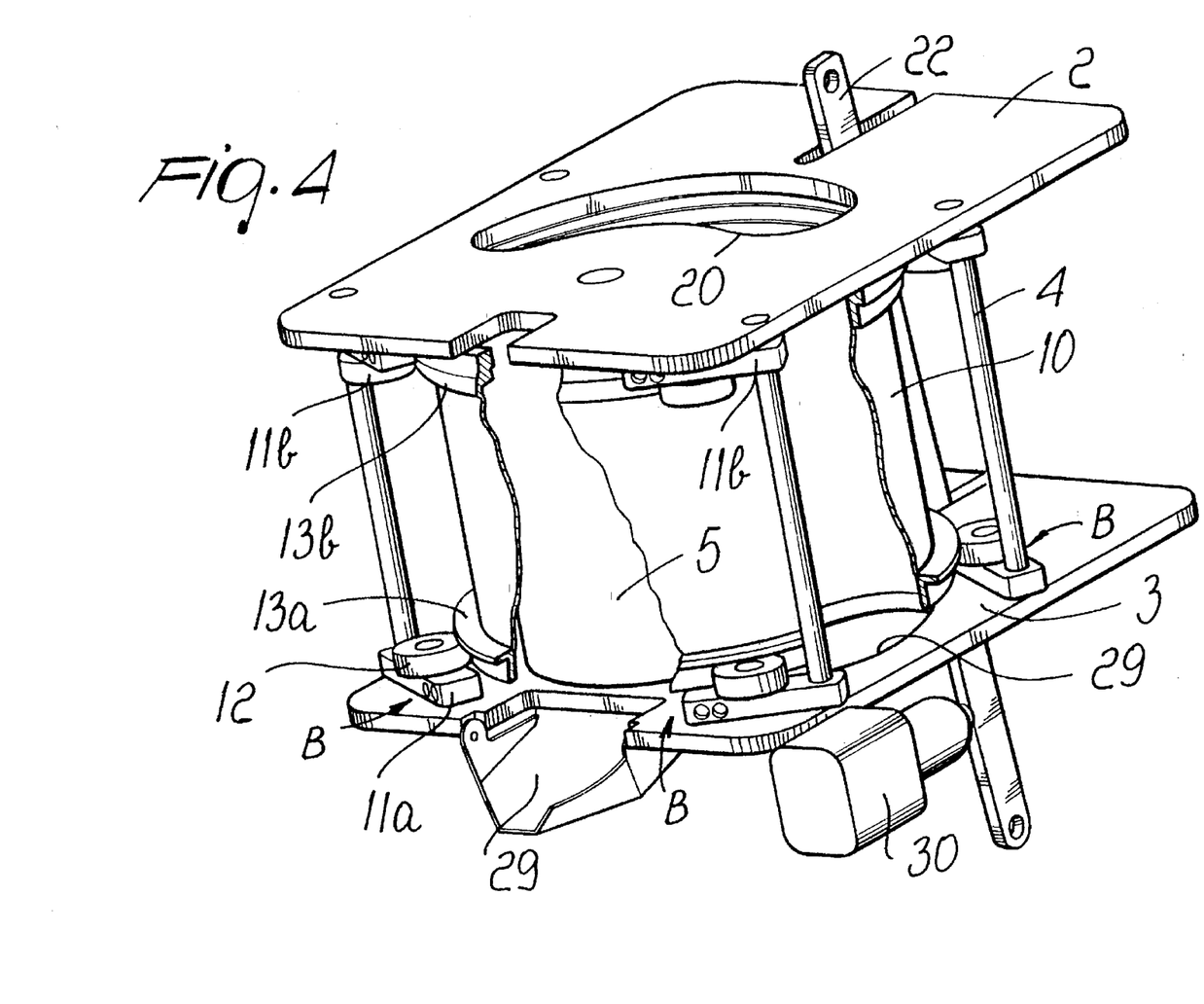
FIG. 4 is a partially cutout perspective view of the juicer of FIG. 1.
Figure 5:
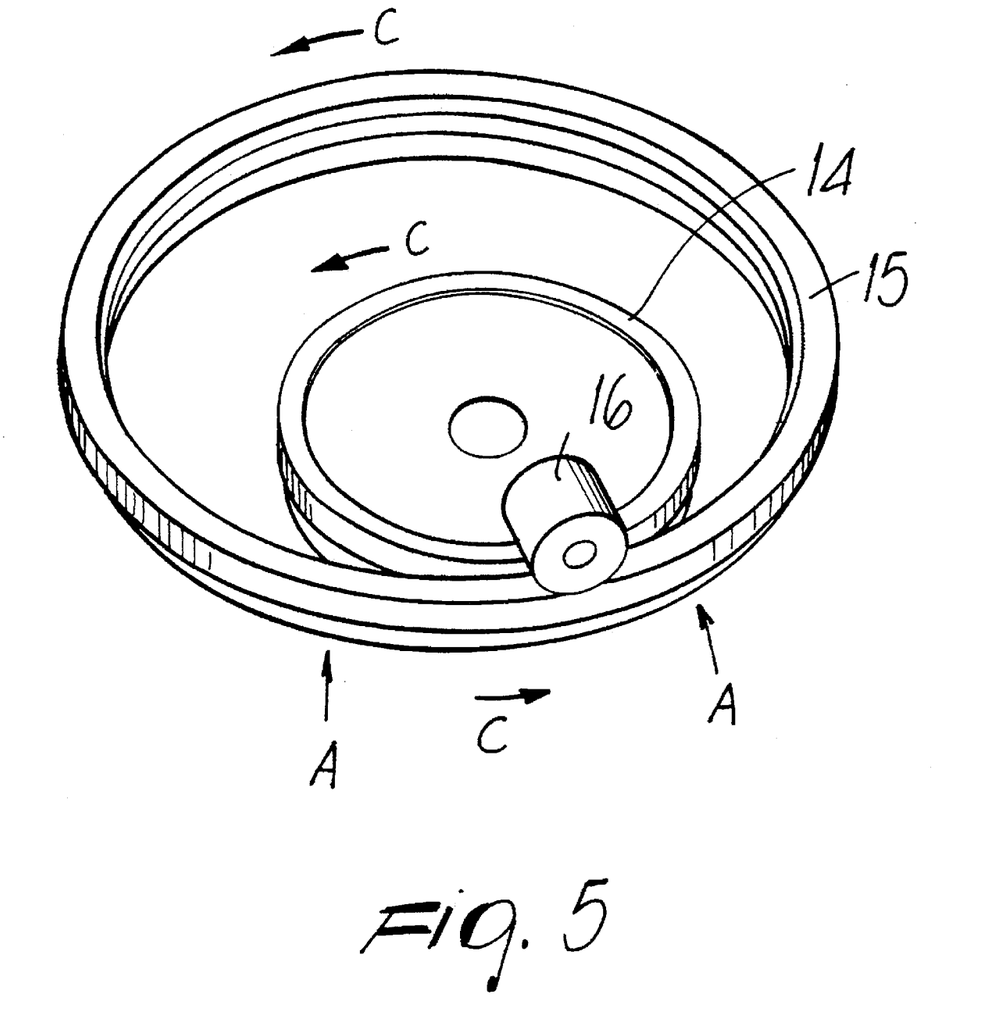
FIG. 5 is a schematic perspective view of the top of the two drums of the juicer.
Figure 6:
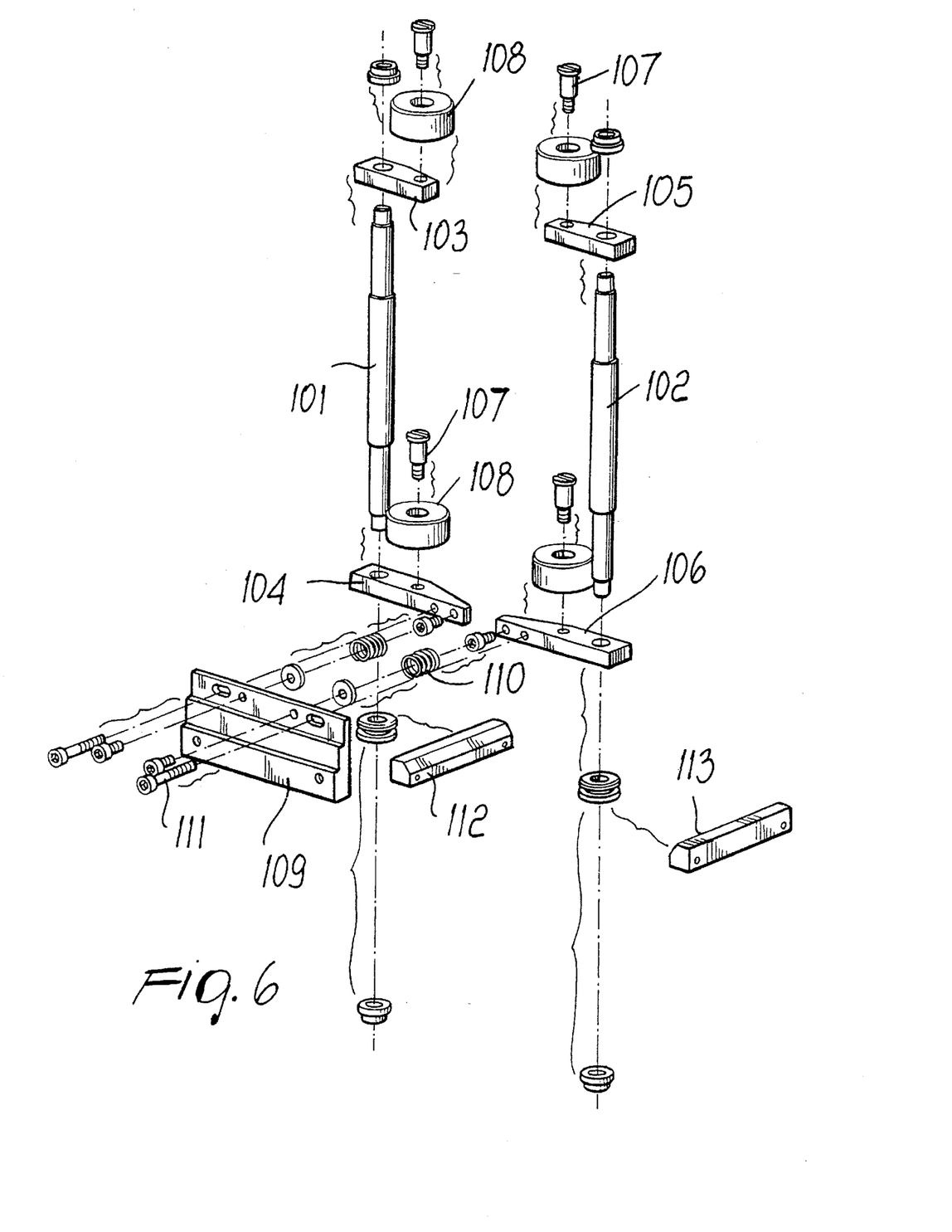
FIG. 6 is an exploded perspective view of another embodiment of the lateral pressing means of the second drum.

In the preferred embodiment illustrated in FIG. 6, instead of four upper arms and four lower arms with respective rollers and preloading springs, there are two vertical shafts 101 that are rotatably mounted between the platforms 2 and 3 and symmetrically rigidly support, above and below, respective arms 103, 104, 105, and 106 that freely rotatably support, by means of pivots 107, respective free rollers 108; the arms 104 and 106, and therefore the arms 103 and 105, are coupled to a vertical plate 109 that is rigidly coupled to the frame of the juicer by respective compression springs 110, which actuate the arms in the direction of the arrows B, and by screws 111 for adjusting the preloading of the springs: the second drum 10 is guided, on its two sides, between two lateral guides 112 and 113.

The drums 5 and 10 are kinematically connected to each other so as to turn in the same direction, arrows C, with substantially equal tangential speeds; in this regard, front sets of radial teeth 14 and 15 are fixed to the upper edges of the drums 5 and 10; a pinion 16 meshes with said sets of teeth and is freely supported by the platform 2 inside a corresponding casing 16a that is shaped like a half-shell and whose axis is substantially horizontal and radial with respect to the edges of the drums.

Figure 7:
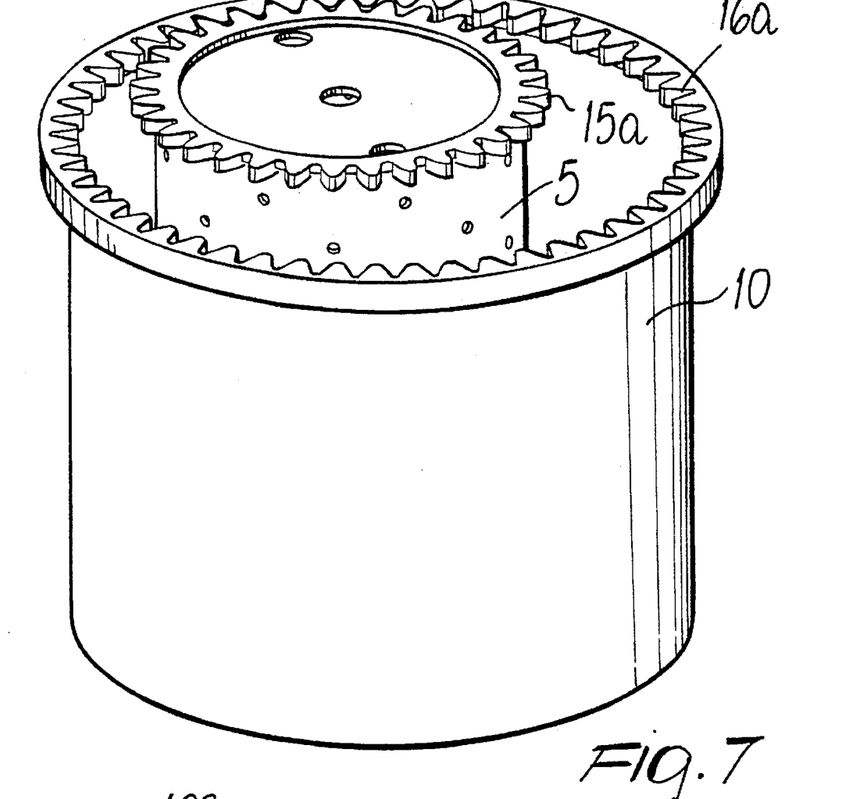
FIG. 7 is a perspective view of another embodiment of the top of the two drums of the juicer of FIG. 5.

In the embodiment shown in FIG. 7, the drums 5 and 10 are respectively provided with an outer set of teeth 15a and with an inner set of teeth 16a that mesh together and have long teeth to allow mutual approach and spacing movements of the drums.

A unit 17 for cutting the fruits F into two halves is mounted above the platform 2 and is constituted by a fixed blade 18 with a substantially vertical cutting edge that continues with two symmetrical diverging curved profiles 19a and 19b that are arranged above an arc-like opening 20 provided to allow the fruit halves Fa, Fb to drop between the drums 5 and 10.

The reference numeral 21 designates a horizontal presser that is orientated radially with respect to the drums and is adapted to press the individual fruits against the fixed blade to cut them; the presser 21 is fixed to the top of a rising lever arm 22 that is pivoted, in a downward region, to a fork 24 by means of a pivot 23; in an intermediate position 22a, the end of a linkage 25 is articulated to the arm 22, its other end being pivoted to the end of a crank 26 that is supported by the hub 6 of the drum 5.

An arc-like sector 27 that has a helical shape is fixed below the platform 2 between the drums 5 and 10 and is adapted to convey the fruit halves Fa, Fb so that the cut surfaces rest against the first drum 5, whose surface is perforated; the fruit is squashed by compressing the fruit halves between the two drums and by allowing the juice to flow downward along the outer surface of the drum 5 or along its inner surface through its perforations; the lateral pressing means of the drum allow to work with fruits having even significantly different diameters without having to perform any adjustment.

The lower platform has, below the squashing region, a hole 28 for the exit of the juice, and has, after the squashing region, a chute 29 for removing the peels of the squashed fruit halves.

Figure 8A:
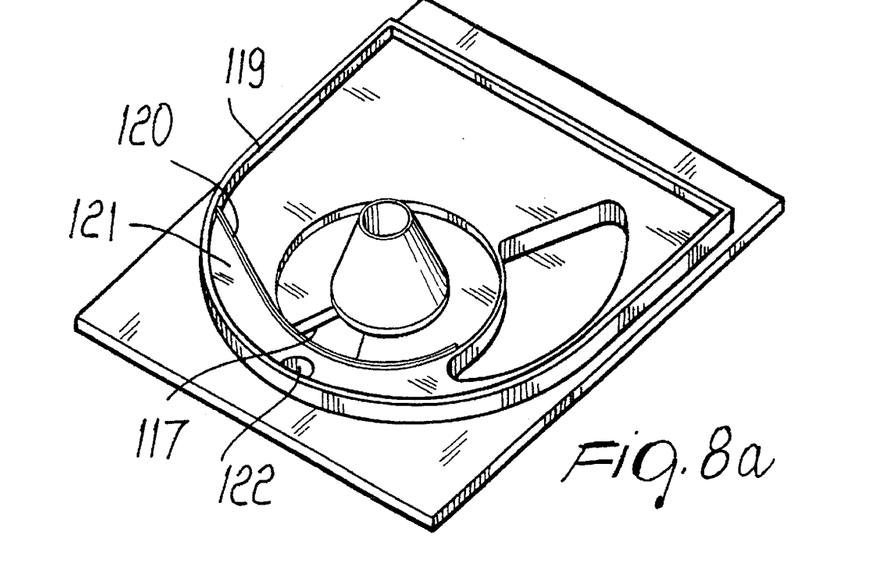
FIGS. 8a, 8b, and 8c are respectively a perspective view, a plan view, and a sectional elevation view of a juice separator tray resting on the lower platform of the juicer.
Figures 8B, 8C:
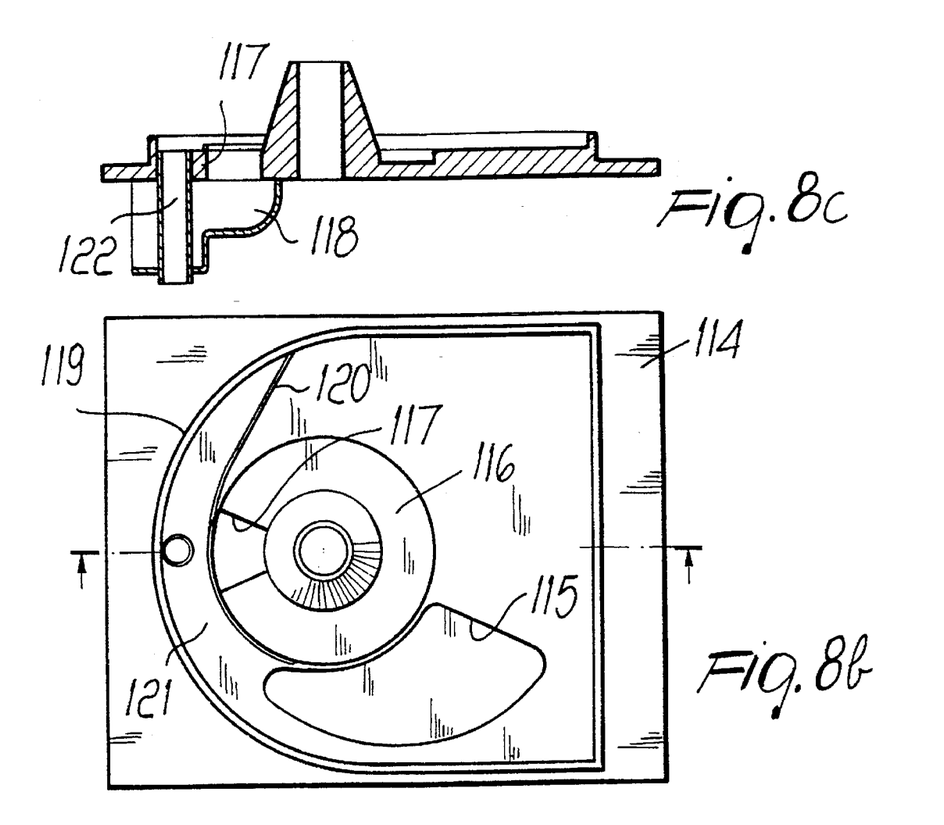

The outer surface of the oranges, which is rich in essential oils, is pressed against the inner surface of the second outer drum 10: the oils trickle down along said surface, and it is necessary to eliminate them from the squash, since they have an unpleasant taste: in relation to this, reference should be made to FIGS. 8a, 8b, and 8c; a slightly tilted flat tray 114 is rested on the lower platform 3 below the lower edges of the drums 5 and 10, and has, at the chute 29, an opening 115 for the peels and a central cavity 116, arranged below the inner drum 5, for collecting the squashed juice, which is connected, by means of a slot 117, to a juice conveyance duct 118: at the region above which the outer drum 10 lies, the tray 114 has a curved edge 119 that is separated from the central cavity 116 by a flat curved diaphragm 120 that forms a region 121 in which the essential oils collect; said oils drip along the inside wall of the drum 10 and are removed through the hole, provided with a duct 122, which is located in the lower part of the region 121.

At the front of the squashing region, the lower portions 4a of the posts 4 are slightly shorter, so that the lower platform 3 is slightly inclined toward the juice outlet hole.

Nozzles for spraying washing water fed by a pressure unit (not shown in the drawings) are mounted inside the drums in the most appropriate positions; a spout 29 is oscillatably mounted below the juice outlet hole 28 and is provided with actuation means 30 that include an eccentric element 30a and are adapted to convey the juice selectively either toward a cup/tray filling station (position shown in the figures) or toward a container for discharging the washing liquid, which is arranged toward the inside of the fixed frame.

A shaped secondary frame 31 is mounted above the platform 2 and forms an inclined plane to allow the fruits to fall from an upper magazine to a platform 32 that is aligned with the blade 18; a pacer or feeding device, not shown in the figure, is advantageously mounted on said shaped platform, is connected to the lever 22 by means of appropriate lever systems, and is actuated thereby to cause one fruit at a time to advance along the platform 32.

The operation of the juicer according to the invention is evident: by virtue of the actuation of the motor 9, the fruit F is first cut into two fruit halves, then the two fruit halves are squashed between the surfaces of the drums, the juice is collected, and the peels are eliminated; the unit is washed periodically.

Figure 9:
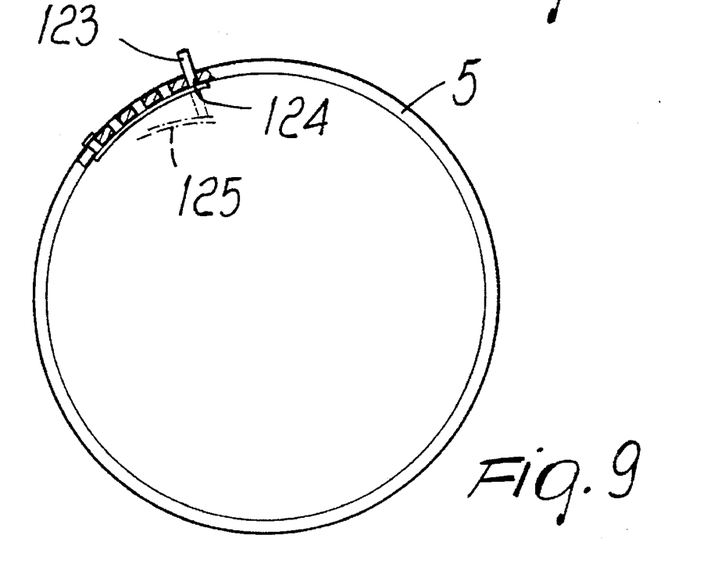
FIG. 9 is a partially sectional plan view of the first inner drum.

To ensure that the orange halves advance between the drums, see FIG. 9, a pin 123 is mounted inside the drum 5, passes through a corresponding hole 124 of the drum, and is fixed to the end of an elastic lamina 125 whose other end is fixed to the inside of the drum: the lamina presses the pin outward, and said pin is thus capable of pushing forward the fruit halves that are squashed between the drums 5 and 10 and can in any case retract when, by rotating, it interferes with the surface of the drum 10.

The washing water is either discharged every time into a duct or collected in a container, optionally together with the peels.

It should be noted that the mechanical action of the drums, which in practice, roll inside each other without sliding due to the identical tangential speed, prevents the squashing and compression of the outer surface of the peels (minimizing the undesirable extraction of essential oils from the peel).

Cleaning of the components is easy, since removal of the platform 2 fitted with the blade, allows to access and remove the drums 5 and 10.

It has thus been observed that the invention achieves the intended aim and object.

The invention thus conceived is susceptible to numerous modifications and variations, all of which are within the scope of the inventive concept.

All the details may furthermore be replaced with other technically equivalent ones.

In practice, the materials employed, as well as the shapes and the dimensions, may be any according to the requirements without thereby abandoning the scope of the protection of the claims that follow.

What is claimed is:

1. Automatic citrus juicer for preparing fruit juice by squashing fruits, the juicer comprising:

a fixed frame including an upper platform and a lower platform, said upper platform including a through opening, and said lower platform including a through hole and an opening; a first drum being mounted for rotation about a vertical axis thereof between said upper and lower platforms, said drum having a perforated outer surface for allowing through passage of said juice;

a second drum extending along a vertical axis thereof, said second drum being supported for eccentric rotation outside said first drum and including an inner surface thereof, said inner surface of said second drum facing said outer surface of said first drum for defining a squashing region therebetween; lateral pressing means for pressing said inner surface of said second drum toward said outer surface of said first drum at a said squashing region;

a cutting unit for cutting the fruits into fruit halves, said cutting unit being mounted above said first and second drums at said opening of the upper platform, the fruit halves being allowed to drop through said opening in said squashing region for resting with cut surfaces thereof against said outer surface of the first drum, wherein squashing occurs between said inner and respectively outer surfaces of said drums, with the juice prepared passing through said hole and remaining fruit peels being removed thorough said opening of said lower platform.

2. Juicer according to claim 1 wherein said drums are mutually connected by kinematic actuation means, said actuation means rotating said drums in a same direction with substantially identical tangential speeds.

3. Juicer according to claim 2, wherein said kinematic actuation means comprise front sets of teeth, said teeth being provided at edges of said drums, a pinion being further provided for meshing with said teeth, said pinion being freely supported by said frame about an axis that is substantially horizontal and radial with respect to the edges of said drums.

4. Juicer according to claim 1, wherein said cutting unit comprises: a fixed blade, said blade having a cutting edge which is substantially vertical and has two diverging curved profiles, said blade being arranged above said opening of the upper platform; and a horizontal presser for pressing individual fruits against said fixed blade, said presser being orientated radially with respect to said drums.

5. Juicer according to claim 1 wherein said second drum has two outer edge rings, and said lateral pressing means comprise: arms being oscillatably mounted, with an elastic preloading, respectively above and below said lower and upper platforms; and freely rotatable rollers for pressing and guiding said outer edge rings of said second drum, said rollers being supported at respective ends of said arms.

6. Juicer according to claim 1, wherein in said squashing region, said lower platform is slightly inclined toward the juice outlet hole.

7. Juicer according to claim 1, wherein a curved sector is fixed between said drums, below said upper platform, said curved sector conveying the fruit halves so that the cut surfaces rest against said first drum outer surface.

8. Juicer according to claim 1, further comprising: a pressure unit for supplying washing liquid; nozzles for spraying the washing liquid supplied by said pressure unit, said nozzles being mounted inside said drums; an oscillating spout located below said juice outlet hole, said spout being provided with actuation means to selectively convey the juice toward any of a cup filling station and a container for discharge of the washing liquid.

9. Juicer according to claim 6, further comprising a flat tray resting above said platform, said tray including a central cavity lying below said first drum to collect the fruit juice and a curved edge, said second drum lying at a region above said curved edge, and said edge being separated from said central cavity by a curved flat diaphragm, said diaphragm forming a region in which essential oils from said fruits collect, said oils dripping along said inside surface of said second drum.

* * * * *